Aug. 11, 1953  J. G. LINDEMAN  2,648,268
UNIT CARRIER
Filed Sept. 5, 1947  4 Sheets-Sheet 2
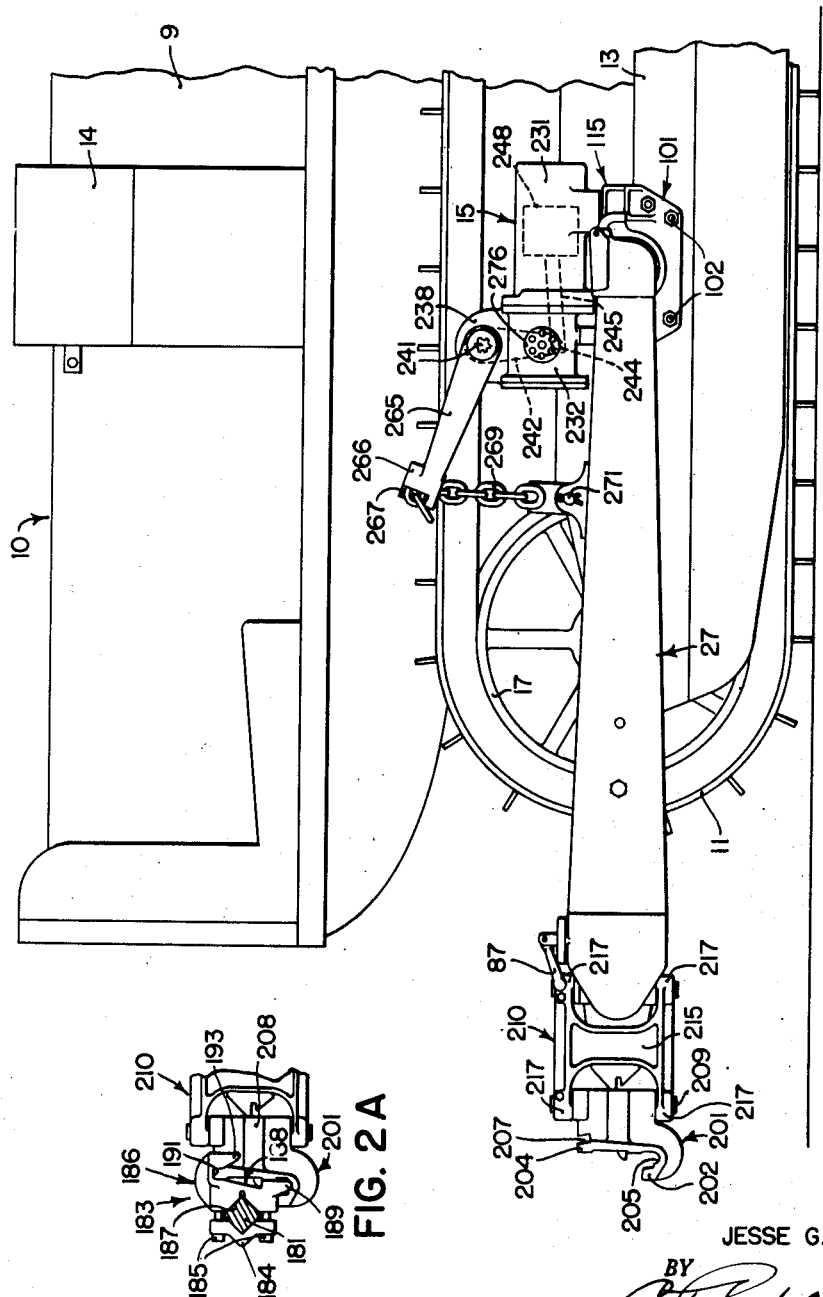
INVENTOR.
JESSE G. LINDEMAN
BY
ATTORNEYS

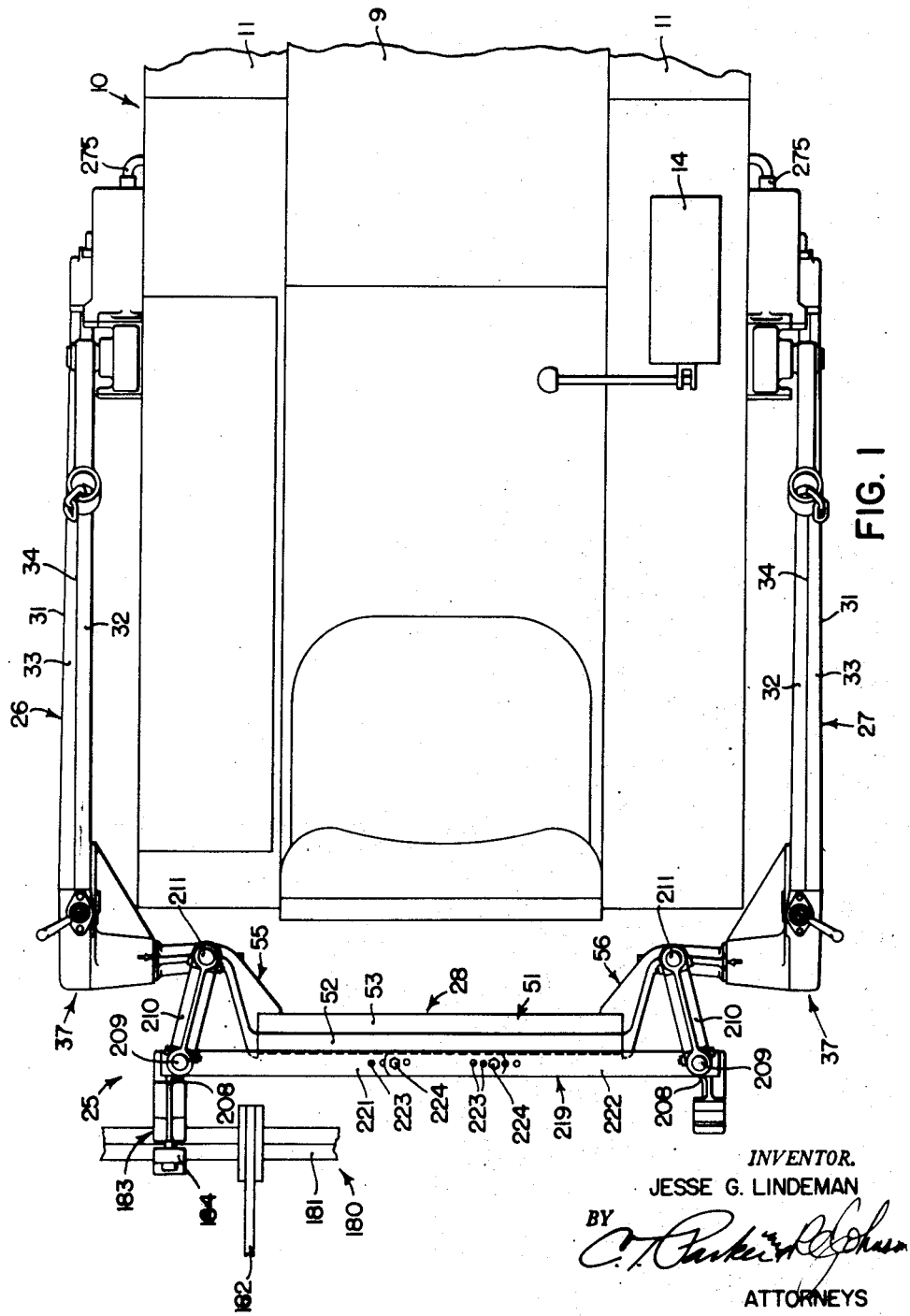

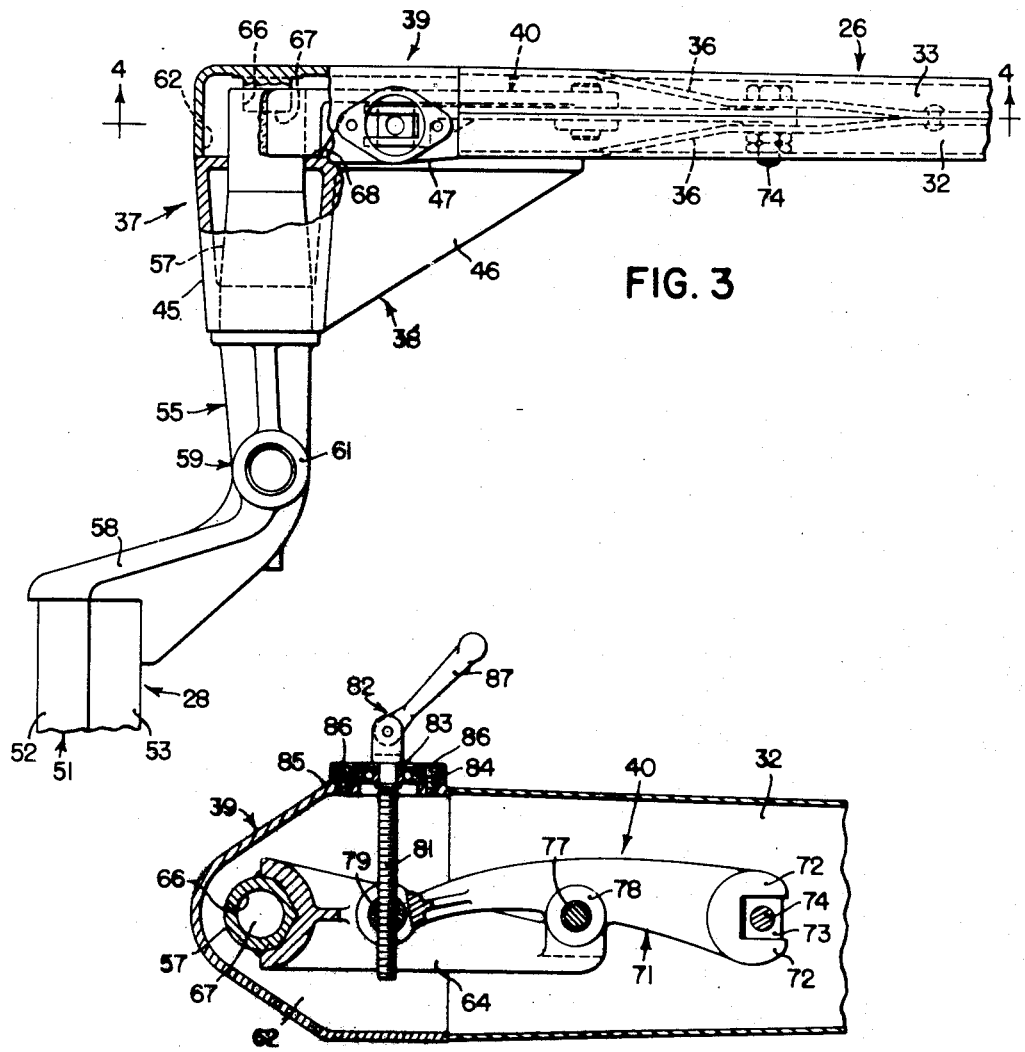

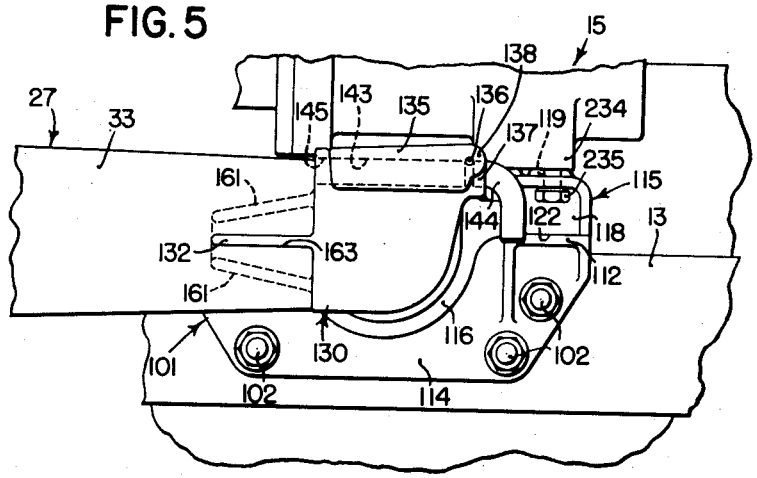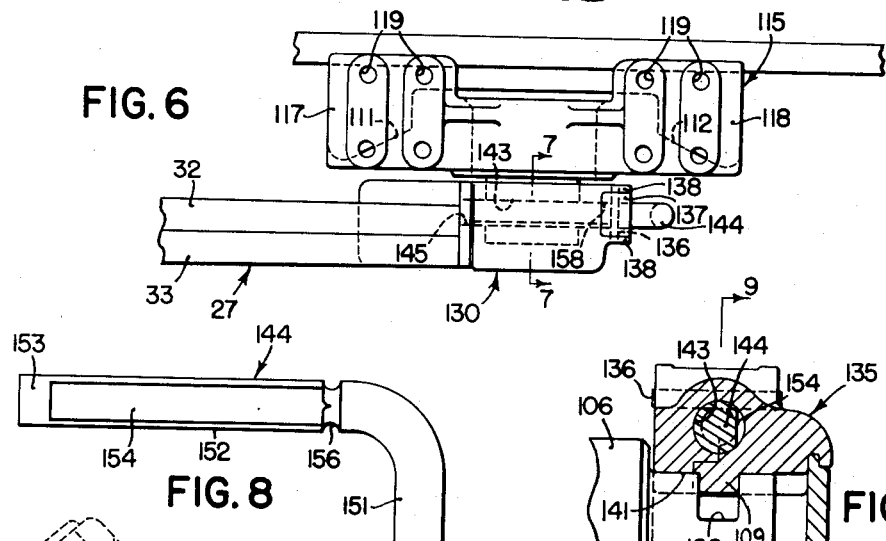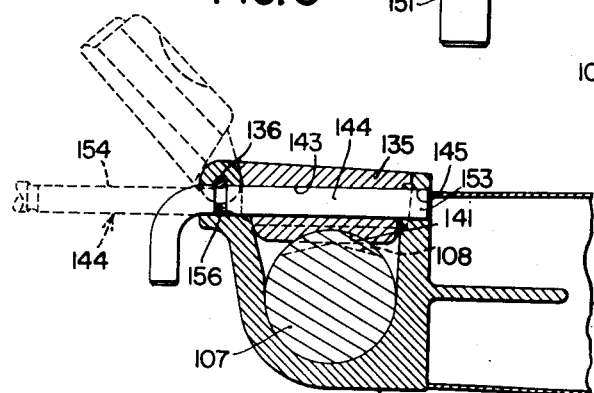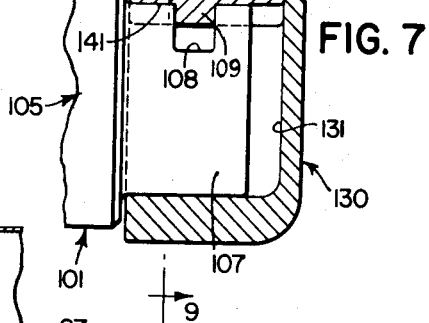

Patented Aug. 11, 1953

2,648,268

UNITED STATES PATENT OFFICE 2,648,268

UNIT CARRIER

Jesse G. Lindeman, Yakima, Wash., assignor to Deere & Company, Moline, Ill., a corporation of Illinois Application September 5, 1947, Serial No. 772,274

10 Claims. (Cl. 97—46.35)

1

The present invention relates generally to agricultural implements and similar implements and more particularly to earth working machinery.

The object and general nature of the present invention is the provision of a new and improved tool carrier adapted to receive and/or support earth working means, such as cultivating tools, material moving or handling means, and the like, and particularly it is a feature of this invention to provide a new and improved tool carrier wherein the position of the tool-receiving bar may readily and easily be adjusted relative to the side arms connecting the end portions of said bar with the tractor, and still further, another feature of this invention is the provision of new and improved connections for connecting a tool supporting member with the tool carrier to accommodate the desired relative lateral movement therebetween.

More specifically, it is a feature of this invention to provide new and improved attachment means for a tool carrier that may be reversed relative to the tractor so as to make it possible to effect such reversal with a minimum amount of manual effort.

These and other objects and advantages of the present invention will be apparent to those skilled in the art after a consideration of the following detailed description, taken in conjunction with the accompanying drawings.

In the drawings:

Figure 1 is a plan view of the preferred form of the present invention, shown as connected to a propelling agency in the form of a tractor of the crawler tread type.

Figure 2 is a side view of the outfit shown in Figure 1; Figure 2A shows the tool bar mounting.

Figure 3 is a fragmentary enlarged view of the adjusting means for the tool bar.

Figure 4 is a sectional view taken generally along the line 4—4 of Figure 3.

Figure 5 is an enlarged side view and Figure 6 is a plan view of the tool frame connection with the tractor crawler track frames.

Figure 7 is a sectional view taken generally along the line 7—7 of Figure 6.

Figure 8 is a detail view of one of the tool frame cap locking pins.

Figure 9 is a sectional view taken generally along the line 9—9 of Figure 7, showing the side arm socket cap in a trunnion releasing position.

For the purpose of illustration I have shown my invention in use with a tractor 10 of the track or crawler tread type having treads or tracks 11 operatively connected in any suitable way with the

2 main body 9 of the tractor 10. The latter is of a commercial type extensively used and has at each side the above mentioned treads or tracks 11 suitably mounted on track frames 13 connected, as aforesaid, to the main frame of the tractor. The tractor 10 includes a suitable power plant and also a hydraulic unit 14 of conventional construction driven from said power plant and including suitable control means (not shown) whereby fluid under pressure may be delivered to or withdrawn from one or more hydraulic piston and cylinder units 15 to which more detailed reference will be made below. Each track frame 13 includes front and rear sprocket wheels 17 over which the crawler tracks or treads 11 pass.

The tool carrier, which constitutes the principal portion of the present invention, is indicated in its entirety by the reference numeral 25 and comprises right and left hand side arms 26 and 27 and a cross bar 28, normally rigidly connected to the outer ends of the side arms 26 and 27. The latter members preferably are identical, except that parts thereof may be right hand or left hand as the case may be, and hence a description of one of them will suffice. Each side arm comprises a tubular member 31 made up of a pair of channel-like elongated members 32 and 33 arranged in opposing relation and having their flanges suitably secured together, as by welding, at 34.

As indicated at 36, Figure 3, portions of the webs of the channel members 32 and 33 may be bent toward one another to receive a pivot bolt 74 that will be referred to later in detail; and at their forward ends the channel members 32 and 33 are secured, as by welding, to the terminal member 37 that is made up of an inner section 38 and an outer section 39, both preferably formed of cast steel parts. The latter members, when secured together and to the adjacent ends of the side arm channel members 32 and 33, form a hollow side arm portion which is adapted to receive cross bar adjusting linkage 40 which will be described later.

Each of the inner side arm terminal members 38 includes a laterally inwardly directed cylindrical bearing sleeve 45 and a reenforcing web 46 which connects the sleeve portion 45 to a rearwardly extending portion 47 that is welded or otherwise fixed to the outer end of the inner channel member 32. The cross bar member 28 preferably comprises a central transverse part 51, preferably made up of two channel-like sections 52 and 53 suitably welded together along their contiguous flanges, and a pair of offset link-receiving members 55 and 56, preferably of identical construction. Each of the latter members includes a spindle portion 57 seating in the bearing section 45, an outer offset section 58 shaped to receive the central bar member 51, which is preferably welded thereto, and a link-receiving portion 59 having a vertically disposed bearing section 61. The outer end of each of the spindle sections 57 extends into the hollow section 62 of the associated side arm and has an arm 64 extending generally longitudinally within the outer end of the associated side arm and firmly fixed, as by welding, to the spindle section 57. The laterally outer end of each spindle section 57 is hollowed to provide a bearing portion 66 which seats over a lug 67 formed on the inside of the laterally outer side arm terminal member 39. The inner face at the forward end of the arm 64 bears against a shoulder 68 on the side arm member 38 for holding the latter, and the side arm itself, against axial displacement away from the cross bar member 59.

The angular relationship between the cross bar 28 and the side arms 26 and 27 may be adjusted when desired by operating the linkages 40 mentioned above, there being one such linkage in the outer end of each side arm, and since these linkages are identical a description of one will suffice. The linkage 40 comprises not only the arm 64 mentioned above, but a second arm 71 which has an inner bifurcated portion 72 slidably disposed on a square block 73 that in turn is rockably mounted on a pivot bolt 74 that is extended through apertures in the side arm channels 32 and 33. The intermediate portion of the arm or lever 71 carries a pivot member 77 that receives the apertured lugs 78 at the outer end of the arm 64. The outer end of the arm or lever 71 is provided with a threaded swivel 79 into which the threaded portion 81 of a crank screw 82 is disposed. The outer end of the crank screw 82 is supported by anti-friction bearing means 83 in a cap 84 that is mounted on a boss 85 formed on the outer side arm terminal member 39, being held in place by cap screws 86 or the like. The outer end of the crank screw member 82 carries an operating handle 87, and it will be seen that by turning the crank screw 82, the arm 71 will be rocked about its pivotal support 74 and, with a multiplied leverage, will act against the arm 64 to turn the cross bar relative to the side arm, thus, in effect, swinging the side arm about a transverse axis coinciding generally with the pivotal connection of the cross bar member 28 therewith. In this way, the position of the cross bar 28 may be changed, that is, the latter member may be leveled, relative to the side arms when the latter are attached to the tractor.

A draw trunnion 101 is disposed at each side of the tractor and preferably is rigidly secured, as by bolts 102, to the associated track frame 13, preferably adjacent the central portion thereof. Each trunnion member 101 comprises an attaching bracket section 114 (Figure 5), in which the holes receiving the bolts 102 are disposed, and a double trunnion section 105 having inner and outer bearing portions 106 and 107, the latter being of slightly smaller diameter than the inner section 106, and both being generally cylindrical. The bearing section 107 is provided with a transverse groove or slot 108 therein which cooperates with means on the associated side arm of the tool frame for holding the side arm in position, as will be referred to later in detail. The laterally inner bearing section 106 of the trunnion 101 is disposed between abutment pads 111 and 112 that are formed integral with the trunnion member 101, and a power cylinder mounting member 115 is carried on the laterally inner bearing section 106. The mounting member 115 includes a sleeve section 116 and laterally outwardly extending sections 117 and 118 having a plurality of bolt holes 119 to receive the associated cylinder unit, described below, and a downwardly facing pair of abutments 122 adapted, when the sleeve section 116 is mounted on the bearing section 106 of the trunnion 101, to rest against the pads 111 and 112 on the member 101. Since the trunnion members 101 are firmly and rigidly secured to the track frames by the bolts 102, the cylinder unit mounted on the mounting member 115 is likewise supported by the bearing section 106 but is held against rocking movement thereon by the pads 111 and 112 and associated parts.

The inner end of each side arm 26 and 27 of the tool frame 25 carries a socket member 130 having a laterally inwardly and upwardly facing socket section 131 and a shank portion 132 that is welded to the inner end of the associated side arm channels. The diameter of the socket 131 is such as to receive the laterally outwardly disposed trunnion bearing section 107, and each socket 131 is open upwardly so as to facilitate the attachment of the arms to the trunnions. Each of the socket members 130 is provided with a cap 135 that is pivoted, as at 136, to a lug extension 137 on the socket member 130. To this end, the cap 135 is provided with a pair of apertured lugs 138 which receive the pin 136. The under portion of the cap, as indicated at 141, is rounded and cooperates with the trunnion bearing section 107, and a lug 109 on each cap enters the associated groove or slot 108 in the bearing portion 107, whereby the cap member holds the side arm in place on the trunnion section 105. The cap member 135 is provided with a longitudinal opening 143 in which a locking pin 144 is adapted to be disposed, the outer end of the locking pin 144 being adapted to be received by an opening 145 formed in the upper portion of the socket member 130. Each locking pin 144 is of particular construction. As shown, the locking pin 144 comprises a handle section 151 and a shank section 152. At its outer end the latter section is cylindrical, as at 153, the major portion of the remainder of the shank being slabbed off, as indicated at 154. Adjacent the handle section 151, the shank section 152 is provided with an annular groove 156. The opening in the socket member lug section 137 is disposed so as to intersect the opening 158 in the lug 137 to receive the locking pin 136. These openings are so disposed that when the pivot pin 136 for the cap is removed the locking pin 144 may be inserted, passing the same through the opening 158 so that the cylindrical portion 153 of the locking pin 144 enters the opening 145 at the other side of the socket. Then by turning the locking pin 144 into such position that the flat portion 154 is disposed upwardly, the pivot pin 136 for the cap may be inserted. Any suitable means may be provided for holding the pin 136 in place, and as long as the latter is in place the locking pin 144 cannot be removed, although it may be withdrawn from the opening 145 in the socket 130. Thus, the locking pin 144 normally remains a permanent part of the cap member and may readily be used for locking the cap member in trunnion-receiving relation by inserting the cylindrical section 153 into the opening 145 and then turning the handle section 151 so that the groove 156, at some point removed from the flat portion 154, embraces the pivot pin 136. This prevents the locking pin 154 from being withdrawn from the socket opening 145. However, all that it is necessary to do to release the cap and swing the same upwardly about the pivot 136 is to swing the handle section 151 so as to carry the flat portion upwardly, whereupon the pin 144 may be slid outwardly relative to the cap member and so withdrawn from the opening 145 in the socket member. The latter member is welded to the inner ends of the side arms, and to this end the shank section 132 is laterally offset and is provided with flanges 161. For a similar purpose the laterally outer side arm channel is provided with a deep notch 163 so as to provide adequate extent of welding when fastening the parts together.

As best shown in Figure 1, according to the principles of the present invention, I provide a tool support indicated in its entirety by the reference numeral 180, for connecting tools or other operating units to the tool frame 25, preferably in such a way as to accommodate lateral movement of the tool unit or units. In the preferred form of the invention the tool support comprises a transverse square bar 181 adapted to receive one or more tool units, indicated diagrammatically in full lines at 182. A pair of supporting clamps at each end of the square bar 181 support the latter. Such clamping means is indicated in its entirety by the reference numeral 183 and comprises a cap 184 secured by a pair of cap screws 185 to a clamping member 186 having a socket 187 to receive the tool bar 181. Each of the clamping members 186 includes a main body section 188 having a lower downwardly extending engaging lug 189 and an upper socket section 191 outwardly of which is disposed a pair of guiding lugs 193 the adjacent edges or walls of which taper convergingly upwardly.

Cooperating with the member 186 is a companion link-receiving bracket member 201 which is provided at its lower portion with an upwardly extending lug 202 and at its upper portion an upwardly extending lug section 204. The lug 202 cooperates with the main body of the bracket 201 to form a notch 205 that is shaped to receive the cooperating lug 189 on the clamping member 183, and the lug 204 forms with the main body of the bracket 201 an upwardly facing upper notch 207 whereby the lug 204 is permitted to seat firmly and snugly in the notch 191 in the clamping member 183.

The inner portion of each of the bracket members 201 is provided with a sleeve section 208 that receives a vertical pivot bolt 209. A pair of link members 210 connects the two bracket members 201 with the cross bar 28, a similar pivot pin 211 connecting the inner portions of the links with the bearing sleeve sections 61 of the associated offset cross bar members 55. Each of the link members 210 comprises a central body section 215 and pairs of apertured lugs 217 receiving the pivot pins 209 and 211. Disposed on the outward pivot pins 209, preferably the upper portions thereof, is a brace member 219 which comprises a pair of overlapping bars 221 and 222, each provided with a plurality of apertures 223 and associated fastening bolt means 224 whereby the effective length of the brace member 219 may be changed as desired. The brace member 219 is disposed adjacent but spaced from the central section 51 of the cross bar member 28, the latter being offset so as to afford ample clearance between the cross bar member and the adjacent portions of the propelling tractor.

By loosening the clamping bolts 185, the position of the clamping members 183 and 184 along the tool supporting bar 81 may be adjusted as desired providing the bolts 224 are removed from the cross brace members 221 and 222. After the desired lateral adjustment has been made, the bolts 224 may be replaced and tightened, whereby the clamping units for the bar 181 remain fixed so far as their lateral spacing is concerned. This also determines the angularity of the connecting links 210 which it will be noted are rigid in a vertical direction but permit lateral movement of the tool means mounted on the bar 181. By virtue of the aforesaid adjustment, the links 210 may be arranged to diverge outwardly or converge outwardly, depending on whether the cross bar member 28 is to be disposed at the front of the tractor or at the rear of the tractor; more detailed reference to which will be made below.

As mentioned above, the tool frame 25, together with any tool unit or units connected thereto, is adapted to be raised and lowered by hydraulic power derived from the unit 14 carried by the tractor, preferably through a pair of hydraulic cylinder units 15. While these units may, in the broader aspects of our invention, be of any suitable construction, they are, according to my invention, preferably so constructed and arranged as to accommodate the ready reversal of the tool frame relative to the tractor; that is, the tool frame may be arranged with the tool carrying cross bar and associated parts either at the front or at the rear of the tractor, as desired.

Referring now to Figure 2, each of the power cylinder units 15 comprises a cylinder section 231 and a crank case section 232. The cylinder section 231 is formed internally as a cylinder and adjacent one end has an attaching pad 234 provided with tapped openings to receive cap screws 235 that extend upwardly through the holes 119 in the cylinder mounting member 115. The crank case section 232 comprises a housing having an upward extension 238 provided with bearing sections in which a shaft 241 is disposed for rocking movement. An arm 242 is fixed to the shaft 241 and extends downwardly into the housing 232, carrying a pivot member 244 to which the outer end of a connecting rod or pitman 245 is connected.

The shaft 241 extends outwardly of the housing 232 in sealed relation and carries a power lift arm 265 having a chain socket 266 at its outer end. A slot 267 in the socket section 266 provides for the reception of a chain link therein whereby a chain 269, connected in any suitable way, as at 271, to the associated side arm, may be connected in adjusted relation between the side arm and the associated power lift arm 265. Fluid under pressure is delivered from the power unit 14 to one end of the cylinder 231 under the control of suitable valve mechanism, not shown, whereby when fluid is delivered to the cylinder 231 and the piston 248 forced outwardly, the arm 265 is raised, thereby acting through the associated chain 269 to raise the tool frame, it being understood that fluid is delivered to both of the hydraulic power lift units 15 whereby the tool frame in being raised is loaded generally uniformly. A filtering vent device 276 is provided for the housing 232.

The operation of the tool carrier described above is substantially as follows.

Figure 1 shows the parts of the device arranged in trailing relation, with the tools 182 adapted to work the ground behind the tractor 10. When arranged in this relation, the brace links 221 and 222 and associated clamps are arranged so as to hold the connecting links 210 in forwardly converging relation, thereby providing for lateral movement of the tool unit or units about a virtual pivot point forward of the actual physical connection between the tool support and the tool frame. If, for example, it should be desired to use tools that are adapted to be pushed, such as, a scraper, snow plow or the like, in which case it is usually desired to dispose the cross bar 28 and associated parts at the front of the tractor, in order to effect the necessary reversal of the tool mounting, all that it is necessary to do is to disconnect the hose couplings 275 and turn the locking pins 144 into a position for unlocking and to withdraw them from the holes 145 in the socket members of the side arms, whereupon the caps 135 may be swung away from the sockets 131 and the front ends of the side arms 26 and 27 may be dropped to the ground. After the side arms are thus disconnected from the tractor, the cylinder units 15 may be disconnected from the sides of the tractor merely by removing them from their bearing supports 106 and disconnecting the hose lines 275, it being necessary, of course, to remove the bolts 235. The tractor 10 may then be backed away from the implement and then driven forwardly into a position for reconnection therewith, the power cylinders and the socket members of the side arms being reconnected with the tractor simply and easily by a reversal of the steps outlined above. The cross bar 28 may be leveled with respect to the tractor and/or the side arms 26 and 27 by turning one or the other of the cranks 87, and the cross bar 28 as a whole may be raised and lowered relative to both of the cranks. Where only leveling is desired, it is necessary to provide only one adjusting crank 87, connecting the other end of the cross bar 28 rigidly to the associated side arm. The convergence or divergence of the links 210 may be adjusted by loosening the crank associated with the bar 181 and readjusting the position of the brace links 221 and 222.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A tool carrier adapted to be connected to a tractor, comprising a pair of side arms, each of said arms being adapted to be connected at its inner end with the tractor, means at the outer ends of said arms forming laterally inwardly extending generally tubular sections open at their laterally inner ends, a transverse cross bar having its ends extending laterally outwardly into and rockably seated in said sections, and separably operable means acting between each end of said cross bar and the associated side arm for adjustably fixing said cross bar to the outer ends of said side arms.

2. A tool carrier adapted to be connected to a tractor, comprising a pair of generally fore and aft extending side arms adapted to be connected at their inner ends to the tractor, each of which includes at its outer end a hollow section having a transversely disposed laterally inwardly opening bar-receiving portion, a transverse cross bar having its laterally outer ends rockably disposed in said bar-receiving portions, a lever arm fixed adjacent one end thereof to each end of said bar and extending into the associated hollow arm section, and means carried by each side arm and connected with the associated lever arm adjacent its other end for adjustably fixing said cross bar to said side arms.

3. A tool carrier adapted to be connected to a propelling agency, such as a tractor, comprising a pair of side arms adapted to extend generally longitudinally of the tractor along the sides thereof, pivotal connecting means at the inner ends of said arms, for connecting them to said tractor, a pair of laterally inwardly directed bearing sections at the outer ends of said arms and said outer ends having hollow arm-receiving portions joining said bearing sections, a transverse tool-receiving cross bar having its ends rockably mounted in said bearing sections, a lever arm fixed to each end of said cross bar laterally outwardly and extending into the hollow arm-receiving portion of the associated side arm, and means extending into the arm-receiving portion of each side arm and acting between the latter and the outer end of the associated lever arm for adjusting the position of the lever arm relative to the side arm associated therewith.

4. In a tool carrier of the type described, a pair of side members, each having a laterally disposed socket, a cross bar carried in said sockets, an arm fixed at one end to each end of said cross bar, a lever connected at an intermediate point to the outer end of each of said arms, means connecting one end of each of said levers to the associated side member, and means connected with the other end of each of said levers and the associated side member for adjusting the position of each lever relative to the associated side member.

5. A tool carrier as set forth in claim 4, further characterized by each of said levers being pivoted to the associated arm, the outer end of each lever having a slidable connection with the associated side member.

6. In a tool carrier for tractors and the like, a frame including a tool-receiving cross bar and a pair of side arms connected thereto, a pair of trunnions adapted to be fixed to said tractor, a pair of socket members fixed to the inner ends of said side arms, a releasable cap for each socket member, each cap having a generally cylindrical surface engageable with the associated trunnion, a lug on each cap extending generally radially inwardly of said cylindrical surface, and a recess in the associated trunnion, said lugs and recesses being located so that each lug seats in the associated recess, thereby holding said socket members against axial displacement relative to said trunnions.

7. In a tool carrier for tractors and the like, a frame including a tool-receiving cross bar and a pair of side arms connected thereto, a pair of trunnions adapted to be fixed to said tractor, a pair of socket members fixed to the inner ends of said side arms, a releasable cap for each socket member engageable with the associated trunnion, hinge means connecting each cap with the associated socket, each of said trunnions having a transversely extending recess, a plunger carried by said cap and engageable with the associated socket member for locking the cap to said socket member, and means on said cap and disposable in said recess when the cap is locked to the associated socket member for holding said socket member on the associated trunnion.

8. In a tool carrier for tractors and the like, a pair of trunnion members adapted to be fixed to opposite sides of the tractor generally centrally thereof, a tool frame having side arms and a cross bar connected to the ends of said side arms, socket members carried by said side arms adjacent the ends thereof opposite said cross bar to receive portions of said trunnion members, a pair of power operated units detachably mounted on said trunnion members, means acting between the latter and said power units to hold the latter against rotation on said trunnion members, means connecting said power units with said side arms, said power units and side arms being detachable from said trunnion members to accommodate the disposition of said frame either at the front or rear of said tractor, said power units being reversible, relative to the tractor, with said side arms, each of said power units including a lift arm and means connecting the lift arm with the associated side frame, said lift arms and associated parts being reversible, relative to the tractor, with said side arms whereby operation of said power units in either position of said power units and frame serves to raise the latter, and tool-receiving means carried by said cross bar.

9. In a tool carrier of the type described, a pair of side members, each having a laterally disposed socket, a cross bar carried in said sockets, an arm fixed at one end to each end of said cross bar, a lever connected at an intermediate point to the outer end of each of said arms, means connecting one end of each of said levers to the associated side member, and adjusting means connected with the other end of each of said levers, said adjusting means comprising a screw-threaded trunnion carried by said other end of each lever and a rotatable part connected with the associated side member and having screw-threaded connection with said trunnion.

10. In a tool carrier for tractors and the like, a frame including a tool-receiving cross bar and a pair of side arms connected thereto, a pair of trunnions adapted to be fixed to said tractor, a pair of socket members fixed to the inner ends of said side arms, a releasable cap for each socket member engageable with the associated trunnion, a pair of interengaging means, one on the cap and the other on said trunnion, for holding each socket member against axial displacement on the associated trunnion, means hingedly connecting each cap to the associated socket member, and means for releasably locking each cap in position on the associated locking member comprising apertures in said cap and socket member and a releasable pin extending through said apertures.

JESSE G. LINDEMAN.

References Cited in the file of this patent

UNITED STATES PATENTS

| Number | Name | Date |
|---|---|---|
| 1,530,100 | Arndt | Mar. 17, 1925 |
| 1,575,011 | Seaholm | Mar. 2, 1926 |
| 1,619,586 | Schley et al. | Mar. 1, 1927 |
| 1,668,067 | Geraldson | May 1, 1928 |
| 1,838,829 | Hewig | Dec. 29, 1931 |
| 1,887,551 | Goble | Nov. 15, 1932 |
| 1,898,353 | Everett et al. | Feb. 21, 1933 |
| 1,960,269 | Lindgren | May 29, 1934 |
| 2,173,158 | Corbett | Sept. 19, 1939 |
| 2,195,611 | Brown | Apr. 2, 1940 |
| 2,233,237 | Andersen et al. | Feb. 25, 1941 |
| 2,239,387 | Johnson | Apr. 22, 1941 |
| 2,274,904 | Lawler | Mar. 3, 1942 |
| 2,292,904 | Shollenberger | Aug. 11, 1942 |
| 2,302,702 | Leschinsky | Nov. 24, 1942 |
| 2,303,379 | Mork | Dec. 1, 1942 |
| 2,322,115 | Cox et al. | June 15, 1943 |
| 2,341,151 | Maloon | Feb. 8, 1944 |
| 2,386,378 | Wippel | Oct. 9, 1945 |
| 2,426,426 | Austin | Aug. 26, 1947 |

FOREIGN PATENTS

| Number | Country | Date |
|---|---|---|
| 886,693 | France | July 12, 1943 |
| 370,891 | Germany | Mar. 8, 1923 |